United States Patent
Iyer

(10) Patent No.: US 11,934,987 B2
(45) Date of Patent: *Mar. 19, 2024

(54) SENTIENT OPTIMIZATION FOR CONTINUOUS SUPPLY CHAIN MANAGEMENT

(71) Applicant: Blue Yonder Group, Inc., Scottsdale, AZ (US)

(72) Inventor: Anand Iyer, Flower Mound, TX (US)

(73) Assignee: Blue Yonder Group, Inc., Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/872,732

(22) Filed: Jul. 25, 2022

(65) Prior Publication Data

US 2022/0358449 A1 Nov. 10, 2022

Related U.S. Application Data

(63) Continuation of application No. 12/043,240, filed on Mar. 6, 2008, now Pat. No. 11,403,581.
(Continued)

(51) Int. Cl.
*G06Q 10/08* (2023.01)
*G06Q 10/06* (2023.01)
(Continued)

(52) U.S. Cl.
CPC ............ *G06Q 10/08* (2013.01); *G06Q 10/06* (2013.01); *G06Q 10/063* (2013.01); *G06Q 10/06315* (2013.01); *G06Q 30/0202* (2013.01)

(58) Field of Classification Search
CPC ...... G06Q 10/08; G06Q 10/06; G06Q 10/063; G06Q 10/06315; G06Q 30/0202
See application file for complete search history.

(56) References Cited

U.S. PATENT DOCUMENTS

| 6,112,126 A | 8/2000 | Hales et al. |
| 6,546,303 B1 | 4/2003 | Fried et al. |

(Continued)

FOREIGN PATENT DOCUMENTS

| TW | 200513872 | 4/2005 |
| TW | 200515239 | 5/2005 |

(Continued)

OTHER PUBLICATIONS

Joseph Pemberton et al., "Making Locally Optimal Decisions on Graphs with Cycles", UCLA Computer Science Department Technical Report No. 920004, Mar. 20, 1992, pp. 1-25.
(Continued)

*Primary Examiner* — Ariel J Yu
*Assistant Examiner* — Denisse Y Ortiz Roman
(74) *Attorney, Agent, or Firm* — Spencer Fane LLP; Steven J. Laureanti

(57) ABSTRACT

A system and method is disclosed for incrementally adjusting a supply chain plan. The system includes a database operable to store data associated with one or more supply chain entities and a server system coupled with the database. The server system receives one or more perturbations in supply chain plan inputs from one or more of the supply chain entities, wherein the perturbations are received during a period of time separating a supply chain planning session from a subsequent supply chain planning session and accesses the data stored in the database associated with the one or more supply chain entities. The server system also incrementally and optimally adjusts the supply chain plan based on the one or more received perturbations and the data stored in the database and communicates the incrementally adjusted supply chain plan to the one or more supply chain entities.

20 Claims, 2 Drawing Sheets

Related U.S. Application Data

(60) Provisional application No. 60/893,428, filed on Mar. 7, 2007.

(51) Int. Cl.
*G06Q 10/063* (2023.01)
*G06Q 10/0631* (2023.01)
*G06Q 30/0202* (2023.01)

(56) References Cited

U.S. PATENT DOCUMENTS

| | | |
|---|---|---|
| 6,748,287 B1 | 6/2004 | Hagen et al. |
| 7,218,980 B1 | 5/2007 | Orshansky et al. |
| 7,225,981 B2 | 6/2007 | Jongebloed |
| 7,788,119 B2 | 8/2010 | Najmi et al. |
| 8,036,921 B2 | 10/2011 | Kumar et al. |
| 8,112,300 B2 | 2/2012 | Harper |
| 2002/0138324 A1 | 9/2002 | Zarefoss et al. |
| 2005/0004826 A1* | 1/2005 | Chen ............... G06Q 30/0201 705/7.29 |
| 2005/0177435 A1 | 8/2005 | Lidow |
| 2006/0206411 A1 | 9/2006 | Rau et al. |

FOREIGN PATENT DOCUMENTS

| | | |
|---|---|---|
| TW | I416341 | 11/2013 |
| WO | WO2006086690 A2 | 8/2006 |

OTHER PUBLICATIONS

Joseph C. Pemberton et al., "Incremental Search Algorithms for Real-Time Decision Making", In: Proceedings 2nd AI Planning Systems Conf. (AIPS-94d) Chicago, Jun. 1994, pp. 1-6.

Robert Benson, "Automated Incremental Production Planning Techniques for the Semiconductor Industry", Department of Industrial Engineering and Operations Research University of California at Berkley, Oct. 7, 1994, pp. 1-40.

Search Report for Taiwan Invention Patent Application No. 098136744; dated Dec. 5, 2014, p. 1.

Search Report for Taiwan Invention Patent Application No. 097108176, dated Oct. 15, 2013.

\* cited by examiner

SENTIENT OPTIMIZATION FOR CONTINUOUS SUPPLY CHAIN MANAGEMENT

CROSS-REFERENCE TO RELATED APPLICATIONS

This application is a continuation of U.S. patent application Ser. No. 12/043,240, filed on Mar. 6, 2008, entitled "Sentient Optimization for Continuous Supply Chain Management," which claims the benefit under 35 U.S.C. § 119(e) to U.S. Provisional Application No. 60/893,428, filed Mar. 7, 2007, and entitled "Incremental Planning." U.S. patent application Ser. No. 12/043,240 and U.S. Provisional Application No. 60/893,428 are assigned to the assignee of the present application.

TECHNICAL FIELD OF THE INVENTION

This invention relates generally to supply chain planning, and more particularly to sentient optimization for continuous supply chain management.

BACKGROUND OF THE INVENTION

A supply chain plan describes items to be procured and operations to be performed by entities within a supply chain network, in order to deliver products, goods, or services to another entity within the supply chain network. Typically, an entity collects the data for the supply chain plan, and then runs an optimization algorithm during a specified time interval (i.e., once every 7 days), to produce the supply chain plan. Because of the complexity of the data associated with the supply chain plan, the typical run-time for generating an optimal supply chain plan may be, for example, 10-12 hours. Once the supply chain plan is generated, the entity distributes the supply chain plan to other entities within the supply chain network and then repeats the process during the next specified time interval.

However, shortly after, if not immediately after, the supply chain plan is generated and distributed to the other entities within the supply chain network, various perturbations (i.e., changes or events) may occur that may render the supply chain plan infeasible. Such perturbations may include, for example, new demands, changes in capacity, changes in inventory, and the like. In addition, because the supply chain plan is only generated during specified time intervals and the run-time is significant in duration (i.e., 10-12 hours), the entity is not able to re-optimize, or otherwise adjust the supply chain plan to a state of feasibility, until the next specified time interval. As a result, conventional efforts to re-optimize or otherwise adjust the supply chain plan to a state of feasibility to account for these perturbations, often involve ad hoc changes that are not optimal. In addition, conventional efforts to reduce the duration of the run-time are disadvantageous, because the speed of optimization is typically incompatible with the quality of the optimization. That is, these conventional efforts to reduce the duration of the run-time adversely affect the quality of the adjustments to the supply chain plan. This inability to reduce the duration of the run-time and re-optimize or otherwise adjust the supply chain plan to a state of feasibility, based on these perturbations is undesirable.

SUMMARY OF THE INVENTION

A system for incrementally adjusting a supply chain plan is disclosed. The system includes a database operable to store data associated with one or more supply chain entities and a server system coupled with the database. The server system is operable to receive one or more perturbations in supply chain plan inputs from one or more of the supply chain entities, wherein the perturbations are received during a period of time separating a supply chain planning session from a subsequent supply chain planning session. The server system is further operable to access the data stored in the database associated with the one or more supply chain entities. The server system is still further operable to incrementally adjust the supply chain plan based on the one or more received perturbations and the data stored in the database and communicate the incrementally adjusted supply chain plan to the one or more supply chain entities.

A method for incrementally adjusting a supply chain plan is also disclosed. The method provides for storing data associated with one or more supply chain entities and receiving one or more perturbations in supply chain plan inputs from one or more of the supply chain entities, wherein the perturbations are received during a period of time separating a supply chain planning session from a subsequent supply chain planning session. The method further provides for accessing the data stored in the database associated with the one or more supply chain entities. The method still further provides for incrementally adjusting the supply chain plan based on the one or more received perturbations and the data stored in the database and communicating the incrementally adjusted supply chain plan to the one or more supply chain entities.

Software for incrementally adjusting a supply chain plan is also disclosed. The software is operable to store data associated with one or more supply chain entities and receive one or more perturbations in supply chain plan inputs from one or more of the supply chain entities, wherein the perturbations are received during a period of time separating a supply chain planning session from a subsequent supply chain planning session. The method is further operable to access the data stored in the database associated with the one or more supply chain entities. The method is still further operable to incrementally adjust the supply chain plan based on the one or more received perturbations and the data stored in the database and communicate the incrementally adjusted supply chain plan to the one or more supply chain entities.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
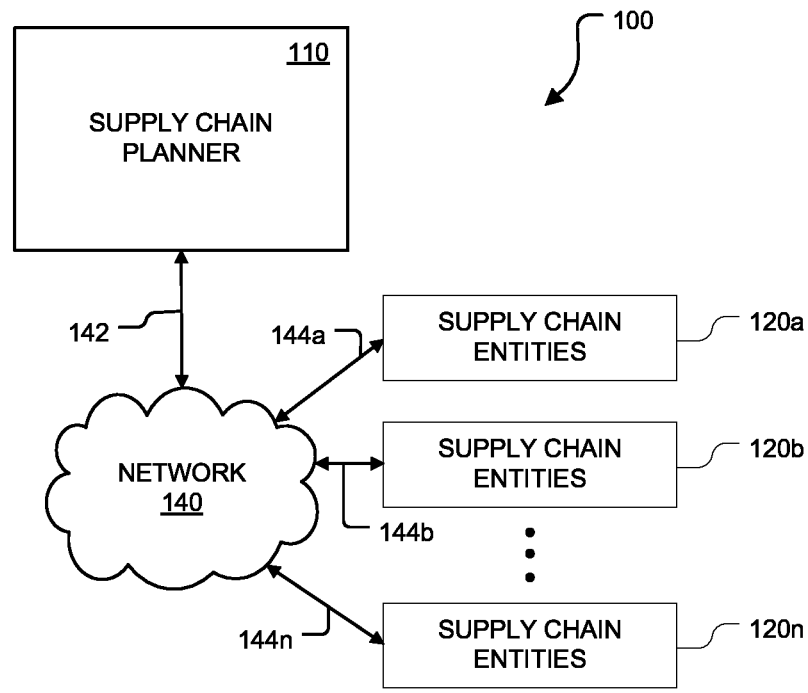
FIG. 1 illustrates an exemplary system according to a preferred embodiment.

FIG. 1 illustrates an exemplary system 100 according to a preferred embodiment. System 100 comprises a supply chain planner 110, one or more supply chain entities 120a-120n, a network 140, and communication links 142 and 144a-144n. Although a single supply chain planner 110, one or more supply chain entities 120a-120n, and a single network 140, are shown and described; embodiments contemplate any number of supply chain planners 110, any number of supply chain entities 120a-120n, and/or any number of networks 140, according to particular needs. In addition, or as an alternative, supply chain planner 110 may be integral to or separate from the hardware and/or software of any one of the one or more supply chain entities 120a-120n.

In one embodiment, system 100 may provide a supply chain plan that describes the flow of items, such as, for example, materials and products through one or more supply chain entities 120 or other supply chain planning environments associated with system 100. As described below, supply chain planner 110 may be used to incrementally adjust the supply chain plan to a state of feasibility and/or optimality due to perturbations (i.e., perturbations to plan execution data) in the supply chain plan inputs relative to a previous supply chain planning session.

For example, the perturbations in the supply chain inputs may include, but are not limited to, new unforecasted orders, new orders, changes to existing orders or forecasts, changes to in-transit shipments, changes to work in progress or work in process, changes in inventory, new capacity, reduced capacity, changes to external supply, and the like. In addition, according to one example, these perturbations (i.e., changes or events) may be classified into categories such as, for example, supply changes, inventory changes, capacity changes, demand changes, and the like. Although example categories of perturbations are described, embodiments contemplate any type of perturbations, changes, events, or categories of perturbations, changes, and/or events, according to particular needs.

In one embodiment, supply chain planner 110 is coupled to network 140 using communications link 142, which may be any wireline, wireless, or other link suitable to support data communications between supply chain planner 110 and network 140 during operation of system 100. One or more supply chain entities 120a-120n are coupled to network 140 using communications links 144a-144n, which may be any wireline, wireless, or other link suitable to support data communications between one or more supply chain entities 120a-120n and network 140 during operation of system 100. Although communication links 142 and 144a-144n are shown as generally coupling supply chain planner 110 and one or more supply chain entities 120a-120n to network 140, supply chain planner 110 and one or more supply chain entities 120a-120n may communicate directly with each other, according to particular needs.

In another embodiment, network 140 includes the Internet and any appropriate local area networks (LANs), metropolitan area networks (MANS), or wide area networks (WANs) coupling supply chain planner 110 and one or more supply chain entities 120a-120n. For example, data may be maintained by supply chain planner 110 at one or more locations external to supply chain planner 110 and one or more supply chain entities 120a-120n and made available to one or more associated users of one or more supply chain entities 120a-120n using network 140 or in any other appropriate manner. Those skilled in the art will recognize that the complete structure and operation of communication network 140 and other components within system 100 are not depicted or described. Embodiments may be employed in conjunction with known communications networks and other components.

Figure 2:
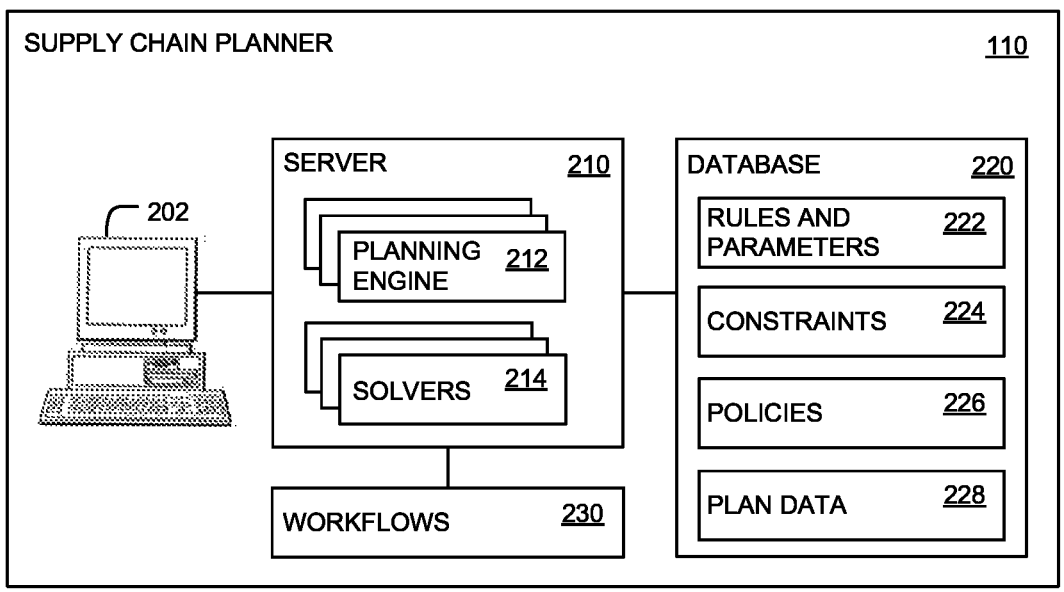
FIG. 2 illustrates the supply chain planner of FIG. 1 in greater detail in accordance with the preferred embodiment.

FIG. 2 illustrates supply chain planner 110 of FIG. 1 in greater detail in accordance with the preferred embodiment. Supply chain planner 110 comprises a computer 202, a server 210, a database 220, and workflows 230. Server 210 comprises one or more planning engines 212 and cluster solvers 214. Although server 210 is shown and described as comprising one or more planning engines 212 and cluster solvers 214, embodiments contemplate any suitable engine, solver, or combination of engines and/or solvers, according to particular needs.

Database 220 comprises one or more databases or other data storage arrangements at one or more locations, local to, or remote from, server 210. Database 220 may be coupled with server 210 using one or more local area networks (LANs), metropolitan area networks (MANs), wide area networks (WANs), network 140, such as, for example, the Internet, or any other appropriate wire line, wireless, or other links. Database 220 stores data that may be used by server 210. Database 220 may include, for example, rules and parameters 222, constraints 224, policies 226, and plan data 228.

In one embodiment, supply chain planner 110 may operate on one or more computers 202 that are integral to or separate from the hardware and/or software that support system 100. Computers 202 may include any suitable input device, such as a keypad, mouse, touch screen, microphone, or other device to input information. An output device may convey information associated with the operation of supply chain planner 110 and one or more supply chain entities 120a-120n, including digital or analog data, visual information, or audio information. Computers 202 may include fixed or removable storage media, such as magnetic computer disks, CD-ROM, or other suitable media to receive output from and provide input to system 100. Computers 202 may include one or more processors and associated memory to execute instructions and manipulate information according to the operation of system 100.

Although a single computer 202 is shown in FIG. 2, supply chain planner 110 and one or more supply chain entities 120a-120n may each operate on separate computers 202 or may operate on one or more shared computers 202. Each of these one or more computers 202 may be a work station, personal computer (PC), network computer, notebook computer, personal digital assistant (PDA), cell phone, telephone, wireless data port, or any other suitable computing device.

In an embodiment, one or more users may be associated with supply chain planner 110 and/or one or more supply chain entities 120a-120n. These one or more users may include, for example, a "planner" handling planning and/or one or more related tasks within system 100. In addition, or as an alternative, these one or more users within system 100 may include, for example, one or more computers 202 programmed to autonomously handle planning and/or one or more related tasks within system 100. Server 210 may support one or more planning engines 212 which may generate supply chain plans based on inputs received from one or more planners and/or database 220, as described more fully below. Plan data 228, within database 220, may include data reflecting supply chain plans generated by one or more planning engines 212 and may be used by planners within system 100, according to particular needs. In general, a planning cycle may include a supply chain planning session and a period of time separating the supply chain planning session from a subsequent supply chain planning session.

Supply chain planner 110, and in particular, server 210, may store and/or access various rules, parameters, constraints, policies, planning data, and workflows associated with one or more supply chain entities 120a-120n. As discussed above, supply chain planner 110 may incrementally adjust the supply chain plan, during the period of time separating the supply chain planning sessions to a state of feasibility and/or optimality due to perturbations (i.e., perturbations to plan execution data) in the supply chain plan inputs relative to a previous supply chain planning session. In addition, as discussed above, these perturbations may be classified into categories, wherein each category of change may include a library of rules and parameters 222 and policies 226 for inducing different behavior based on the perturbations.

In one embodiment, one or more planning engines 212 may generate one or more workflows 230 to incrementally and optimally adjust the supply chain plan during the period of time separating the supply chain planning sessions. As an example only and not by way of limitation, workflows 230 may include, a planning in increments with time advance workflow, a planning in increments with no time advance workflow, and/or any other suitable workflow that incrementally adjusts the supply chain plan to a state of feasibility and/or optimality due to perturbations in the supply chain plan inputs during the period of time separating the supply chain planning sessions.

The planning in increments with time advance workflow may be invoked to evaluate or prescribe perturbations as a result of execution changes relative to a previous supply chain plan. In addition, or as an alternative, the planning in increments with time advance workflow is invoked where the perturbations (i.e., changes in demand, supply, inventory, and the like) occur during the period of time separating the supply chain planning sessions. The effect of these perturbations is superimposed on the previous supply chain plan to generate a new supply chain plan (i.e., an incremental adjustment of the previous supply chain plan). That is, the perturbations (i.e., changes in demand, supply, inventory, and the like) and the planning data associated with a previous supply chain plan are reconciled, to generate a new supply chain plan.

The planning in increments with no time advance workflow may be invoked to evaluate incremental changes which occur during the period of time separating the supply chain planning sessions, in situ. That is, a user associated with one or more supply chain entities 120a-120n may consider the effect of different changes or events on an existing supply chain plan, such as, for example, during a what-if situation. Although examples of workflows 230 are described, workflows 230 may include any suitable workflow that incrementally adjusts the supply chain plan to a state of feasibility and/or optimality due to perturbations in the supply chain plan inputs during the period of time separating the supply chain planning sessions.

In one embodiment, cluster solvers 212 solve a limited cluster of problems associated with the perturbations in the supply chain inputs relative to the previous supply chain planning session. That is, each solver within cluster solvers 212 focuses on only one kind of change or event that occurs during the period of time separating the supply chain planning sessions. In addition, or as an alternative, the actions taken by cluster solvers 212 with respect to the change or event may be dependent on that particular change or event. For example, if a user associated with one or more supply chain entities 120a-120n cancels an order, then cluster solvers 212 may take actions that are dependent on the canceling of an order, and may be, for example, different from actions taken if the user associated with one or more supply chain entities 120a-120n places a larger order for the same item or product. In essence, the action taken by cluster solvers 212 is dependent on the kind of change cluster solvers 212 is ameliorating.

In addition, cluster solvers 212 may include incremental planning solvers, such as, for example, a manufacturing planning solver, a distribution planning solver, an order planning solver, and any other solver. Although examples of cluster solvers 212 are described, cluster solvers 212 may include any suitable solver that solves any type of perturbations in the supply chain inputs.

In one embodiment, constraints 224 restrict the feasibility and/or optimization of a supply chain plan. As described more fully below, constraints 224 may be either a hard constraint or a soft constraint. Constraints 224 may be automatically generated in response to rules and parameters 222 and policies 226 stored in database 220, or constraints 224 may be created or modified in response to input received from perturbations in the supply chain plan inputs. In addition, constraints 224 may include additional constraints and/or additional sets of constraints, in order to preserve part of a previous supply chain plan generated during the previous supply chain planning session.

To further explain the operation of supply chain planner 110, an example is now given. In the following example, supply chain entity 120a may be a distributer of three products. Supply chain entity 120a outsources the manufacturing of the three products to two factories (i.e., supply chain entities 120b and 120c). In this example, supply chain entity 120b may have a capacity constraint of 4,000 units and supply chain entity 120c has a capacity constraint of 3,000 units. In addition, each of the three products may be manufactured at either factory, that is, either supply chain entity 120b or 120c. However, the profit supply chain entity 120a may realize by manufacturing the three products at supply chain entity 120b or 120c may be substantially different.

In this example, the demand for the first product is 1,000 units, the demand for the second product is 3,000 units, and the demand for the third product is 2,000 units. In addition, in this example, the profit for manufacturing the first product at supply chain entity 120b is $45 and the profit for manufacturing the first product at supply chain entity 120c is only $30. The profit for manufacturing the second product at supply chain entity 120b is $10 and the profit for manufacturing the second product at supply chain entity 120c is only $5. The profit for manufacturing the third product at supply chain entity 120b is $5 and the profit for manufacturing the first product at supply chain entity 120c is only $1.

Server 210 generates a supply chain plan, during a scheduled supply chain planning session, based on, at least the rules and parameters, constraints, policies, and plan data associated with this particular example and described above. The supply chain plan generated by server 210, in this example, may be such that profit is maximized and 1,000 units of the first product are to be manufactured at supply entity 120b, with an expected profit of $45,000, 3,000 units of the second product are to be manufactured at supply entity 120b, with an expected profit of $30,000, and 2,000 units of the third product are to be manufactured at supply entity 120*c*, with an expected profit of $10,000.

However, subsequent to the generation of the supply chain plan and during a period of time separating the supply chain planning session from a subsequent supply chain planning session, supply chain planner 110 receives a new order, increasing the demand for the first product by 500 units, that is, for a total demand of 1,500 units for the first product. In this example, the perturbation (i.e., the new order) may be classified into the category of "demand change", which as discussed above, may include a library of rules and parameters 222 and policies 226 for inducing the behavior based on the perturbation of the category "demand change". Supply chain planner 110 may incrementally and optimally adjust the supply chain plan to manufacture the new order (i.e., the additional demand for 500 units of the first product), at supply chain entity 120*c*, if, for example, the rules and parameters 222 and policies 226 prevent any changes to the capacity constraint associated with supply chain entity 120*b*.

Continuing with this example and subsequent to the incremental and optimal adjustment of the supply chain plan during the period of time separating the supply chain planning sessions, supply chain planner 110 receives another perturbation in the supply chain inputs. This perturbation is a notification that a particular regulation requires that the entirety of the first product must be manufactured in the same factory (i.e., supply chain entity 120*b*). However, based on this new perturbation in the supply chain input, the incremental adjustment of the supply chain plan, previously conducted, is no longer viable. That is, because this new perturbation requires that the entirety of the first product must be manufactured in the same factory (i.e., supply chain entity 120*b*) the additional demand for 500 units of the first product cannot be manufactured at supply chain entity 120*c*.

Although, as discussed above, constraints 224 may be either hard constraints or soft constraints. That is, in this example, the capacity constraint of 4,000 units associated with supply chain entity 120*b* may either be a hard constraint or a soft constraint as a matter of policy, judgment, and/or circumstances. In this example, supply chain planner 110 may communicate with supply chain entity 120*b*, or a user associated with supply chain entity 120*b* to determine if the capacity constraint of 4,000 units is a hard constraint or a soft constraint. Thereafter, supply chain planner 110 may incrementally and optimally adjust the supply chain plan to manufacture the new order (i.e., the additional demand for 500 units of the first product), at supply chain entity 120*b*, if, for example, the capacity constraint associated with supply chain entity 120*b* is a soft constraint or at least is a hard constraint that may be modified (i.e., maybe not a physical hard constraint).

Figure 3:
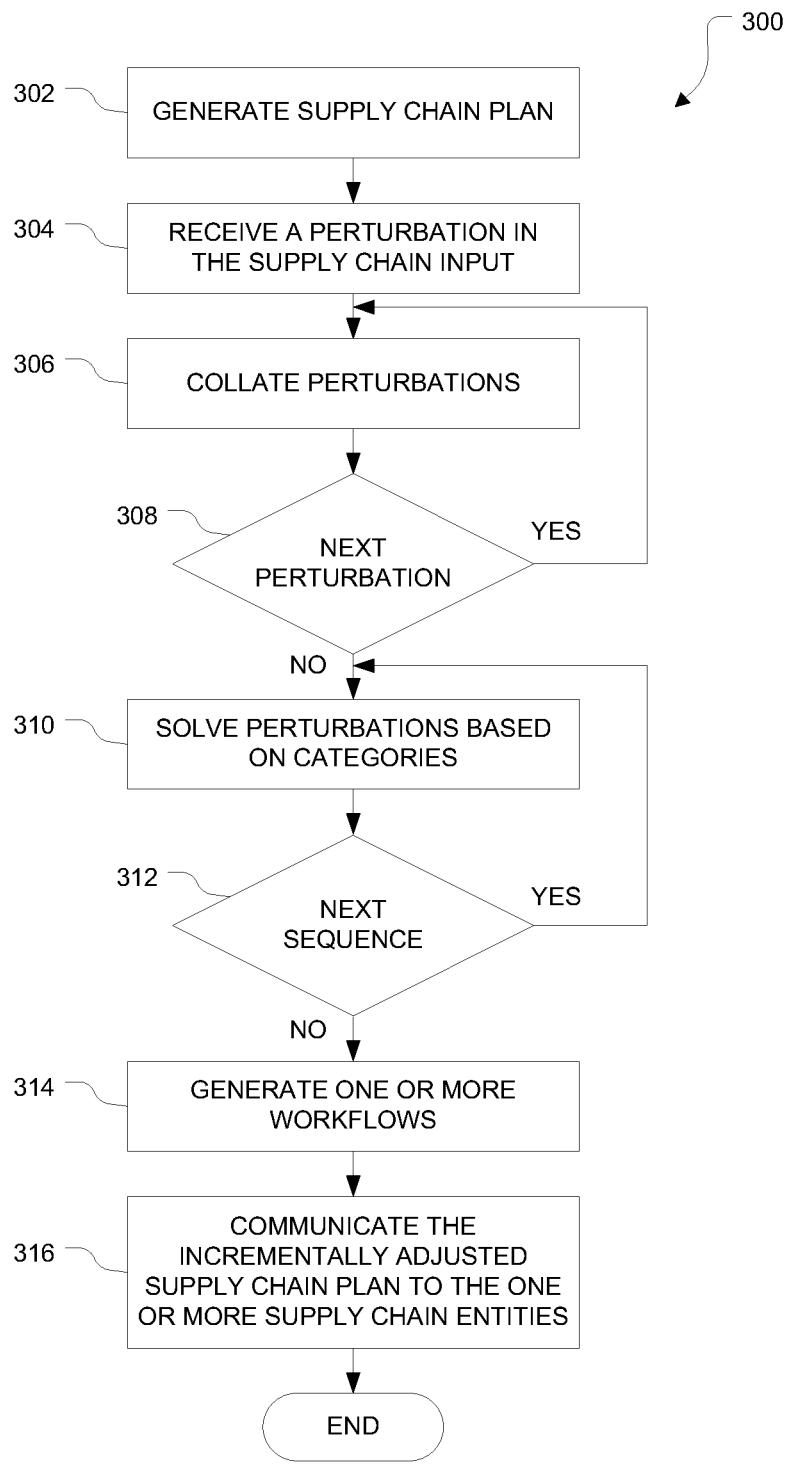
FIG. 3 illustrates an exemplary method for sentient optimization for continuous supply chain management.

FIG. 3 illustrates an exemplary method 300 for sentient optimization for continuous supply chain management. The method begins at step 302, where supply chain planner 110 generates an initial supply chain plan at a scheduled supply chain planning session. At step 304, subsequent to the generation of the supply chain plan and during a period of time separating the supply chain planning session from a subsequent supply chain planning session, a perturbation in the supply chain input is received by supply chain planner 110.

As discussed above, a perturbation in the supply chain inputs may include, but are not limited to new unforecasted orders, new orders, changes to existing orders or forecasts, changes to in-transit shipments, changes to work in progress or work in process, changes in inventory, new capacity, reduced capacity, changes to external supply, and the like. In addition, these perturbations (i.e., changes or events) may be classified into categories such as, for example, supply changes, inventory changes, capacity changes, demand changes, and the like. Although example categories of are described, embodiments contemplate any type of perturbations, changes, events, or categories of perturbations, changes, and/or events, according to particular needs.

Supply chain planner 110 collates the perturbations in the supply chain inputs at step 306 to yield a result set of net perturbations that are to be processed. If there is a next perturbation in the supply chain input at step 308, supply chain planner 110 returns to step 306 to select the perturbation. As an example only and not by way of limitation, step 308 may be required if multiple perturbations are associated with the same supply chain entity, such as, for example, increase demand quantity, decrease demand quantity, cancel order, and the like. If there is no next perturbation in the supply chain inputs at step 308, supply chain planner 110 proceeds to step 310.

At step 310, cluster solvers 214 may provide for a sequence of solving the perturbations based on the various classifications of categories of the perturbations. As an example only, and not by way of limitation, the sequence for solving the perturbations may be to solve the supply changes first, then the solve inventory changes, then solve the capacity changes, and then finally solve the demand changes. Although, an example sequence of solving the perturbations is described, cluster solvers 212 may include any suitable sequence for solving any type of perturbations in the supply chain inputs, in any particular order. In addition, or as an alternative, each solver within cluster solvers 212 may solve the perturbations using any algorithmic technique.

Cluster solvers 214 may include and/or ignore infeasibilities that exist in the supply chain plan. In addition, cluster solvers 214 may solve only the infeasibilities associated with the perturbations received subsequent to the generation of the supply chain plan and during a period of time separating the supply chain planning session from a subsequent supply chain planning session. If there is another (i.e., next) sequence of solving the perturbations based on either the various classifications of categories or based on other input at step 312, supply chain planner 110 returns to step 310 to select the sequence of solving the perturbations. If there is no next sequence of solving the perturbations at step 312, supply chain planner 110 generates one or more workflows 230 to incrementally and optimally adjust the supply chain plan at step 314. Supply chain planner 110 then communicates the incrementally and optimally adjusted supply chain plan to one or more supply chain entities 120*a*-120*n* at step 316 and the method ends.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A supply chain planning system, comprising:
a supply chain planner comprising one or more workflows, a server, and a database, the server further comprising a planning engine and a cluster of solvers; the database storing data associated with one or more supply chain entities;
a communications network connecting the supply chain planner with one or more supply chain entities;
the server configured to perform the following steps:
generate, using the planning engine, an initial supply chain plan during a first supply chain planning session and communicate the initial supply chain plan over the communications network to the one or more supply chain entities;
execute a workflow of the one or more workflows to receive one or more perturbations in supply chain plan inputs over the communications network from one or more of the supply chain entities;
compare the one or more perturbations with data stored in the database associated with the one or more supply chain entities to determine whether at least one supply chain plan input has changed;
classify the one or more perturbations into one or more categories, wherein the one or more categories determine a type of perturbation assigned to a solver of the cluster of solvers;
assign each perturbation of the one or more perturbations to a particular solver out of the cluster of solvers associated with the server and configured to solve a category of perturbations out of the one or more categories associated with the one or more perturbations relative to the first supply chain planning session;
incrementally adjust the initial supply chain plan based on one or more solutions provided by the one or more cluster solvers; and
communicate the incrementally adjusted supply chain plan over the communications network to the one or more supply chain entities.

2. The system of claim 1, wherein the server is further configured to:
assign, according to a sequence, each perturbation of the one or more perturbations to a particular solver out of the cluster of solvers associated with the server.

3. The system of claim 1, wherein the server is further configured to:
determine that one or more perturbations are associated with a same supply chain entity of the one or more supply chain entities; and
collate the one or more perturbations associated with the same supply chain entity.

4. The system of claim 1, wherein the one or more solutions provided by the one or more cluster solvers incrementally adjust the initial supply chain plan to a state of feasibility or optimality.

5. The system of claim 4, wherein one or more constraints restrict a feasibility or optimization of the adjusted supply chain plan.

6. The system of claim 5, wherein the one or more constraints are created or modified in response to input received from the one or more perturbations in supply chain plan inputs.

7. The system of claim 5, wherein the one or more constraints comprise one or more hard constraints, one or more soft constraints or a combination thereof.

8. A computer-implemented method, comprising:
interconnecting one or more supply chain entities via a communications network with a supply chain planner, the supply chain planner further comprising one or more workflows, a server, and a database, the server further comprising a planning engine and a cluster of solvers;
storing data associated with the one or more supply chain entities in the database;
generating, using the planning engine, an initial supply chain plan during a first supply chain planning session and communicating the initial supply chain plan over the communications network to the one or more supply chain entities;
receiving one or more perturbations, by the server executing one or more workflows, in supply chain plan inputs over the communications network from one or more of the supply chain entities;
comparing, by the server, the one or more perturbations with data stored in the database associated with the one or more supply chain entities to determine whether at least one supply chain plan input has changed;
classifying, by the server, the one or more perturbations into one or more categories, wherein the one or more categories determine a type of perturbation assigned to a solver of the cluster of solvers;
assigning, by the server, each perturbation of the one or more perturbations to a particular solver out of the cluster of solvers associated with the server and configured to solve a category of perturbations out of the one or more categories associated with the one or more perturbations relative to the supply chain planning session;
incrementally adjusting, by the server, the initial supply chain plan based on one or more solutions provided by the one or more cluster solvers; and
communicating the incrementally adjusted supply chain plan over the communications network to the one or more supply chain entities.

9. The method of claim 8, the method further comprising:
assigning, according to a sequence, by the server, each perturbation of the one or more perturbations to a particular solver out of the cluster of solvers associated with the server.

10. The method of claim 8, the method further comprising:
determining, by the server, that one or more perturbations are associated with a same supply chain entity of the one or more supply chain entities; and
collating, by the server, the one or more perturbations associated with the same supply chain entity.

11. The method of claim 8, wherein the one or more solutions provided by the one or more cluster solvers incrementally adjust the initial supply chain plan to a state of feasibility or optimality.

12. The method of claim 11, wherein one or more constraints restrict a feasibility or optimization of the adjusted supply chain plan.

13. The method of claim 12, wherein the one or more constraints are created or modified in response to input received from the one or more perturbations in supply chain plan inputs.

14. The method of claim 12, wherein the one or more constraints comprise one or more hard constraints, one or more soft constraints or a combination thereof.

15. A non-transitory computer-readable medium embodied with software, the software when executed using one or more computers is configured to:

interconnect one or more supply chain entities via a communications network with a supply chain planner, the supply chain planner further comprising one or more workflows, a server, and a database, the server further comprising a planning engine and a cluster of solvers;

store data associated with the one or more supply chain entities in the database;

generate an initial supply chain plan during a first supply chain planning session and communicate the initial supply chain plan over the communications network to the one or more supply chain entities;

receive one or more perturbations, by executing one or more workflows, in supply chain plan inputs over the communications network from one or more of the supply chain entities;

compare the one or more perturbations with data stored in the database associated with the one or more supply chain entities to determine whether at least one supply chain plan input has changed;

classify the one or more perturbations into one or more categories, wherein the one or more categories determine a type of perturbation assigned to a solver of the cluster of solvers;

assign each perturbation of the one or more perturbations to a particular solver out of the cluster of solvers associated with the server and configured to solve a category of perturbations out of the one or more categories associated with the one or more perturbations relative to the supply chain planning session;

incrementally adjust the initial supply chain plan based on one or more solutions provided by the one or more cluster solvers; and communicate the incrementally adjusted supply chain plan over the communications network to the one or more supply chain entities.

16. The non-transitory computer-readable medium of claim 15, wherein the software is further configured to:
assign, according to a sequence, each perturbation of the one or more perturbations to a particular solver out of the cluster of solvers associated with the server.

17. The non-transitory computer-readable medium of claim 15, wherein the software is further configured to:
determine that one or more perturbations are associated with a same supply chain entity of the one or more supply chain entities; and
collate the one or more perturbations associated with the same supply chain entity.

18. The non-transitory computer-readable medium of claim 15, wherein the one or more solutions provided by the one or more cluster solvers incrementally adjust the initial supply chain plan to a state of feasibility or optimality.

19. The non-transitory computer-readable medium of claim 18, wherein one or more constraints restrict a feasibility or optimization of the adjusted supply chain plan.

20. The non-transitory computer-readable medium of claim 19, wherein the one or more constraints are created or modified in response to input received from the one or more perturbations in supply chain plan inputs.

\* \* \* \* \*